US012779670B2

(12) United States Patent
Luo et al.

(10) Patent No.: US 12,779,670 B2
(45) Date of Patent: Nov. 3, 2026

(54) ROBOT REAL TIME PATH TRACKING UNDER REMOTE TOOL CENTER POINT FRAME

(71) Applicant: FANUC AMERICA CORPORATION, Rochester Hills, MI (US)

(72) Inventors: Yi Luo, Rochester Hills, MI (US); Min-Ren Jean, Rochester Hills, MI (US); Peter Swanson, Bloomfield Hills, MI (US); Wan Kei Kam, Rochester Hills, MI (US); Nivedhitha Giri, Farmington Hills, MI (US)

(73) Assignee: FANUC America Corporation, Rochester Hills, MI (US)

( * ) Notice: Subject to any disclaimer, the term of this patent is extended or adjusted under 35 U.S.C. 154(b) by 101 days.

(21) Appl. No.: 18/794,314

(22) Filed: Aug. 5, 2024

(65) Prior Publication Data

US 2025/0058459 A1 Feb. 20, 2025

Related U.S. Application Data

(60) Provisional application No. 63/519,893, filed on Aug. 16, 2023.

(51) Int. Cl.
*B25J 9/16* (2006.01)
*B25J 13/08* (2006.01)
*G05B 19/4155* (2006.01)

(52) U.S. Cl.
CPC ........... *B25J 9/1605* (2013.01); *B25J 9/1694* (2013.01); *B25J 13/089* (2013.01); *G05B 19/4155* (2013.01); *G05B 2219/40269* (2013.01)

(58) Field of Classification Search
CPC ...... B25J 9/1605; B25J 9/1694; B25J 13/089; B25J 9/1664; B25J 9/1684; B25J 13/00;
(Continued)

(56) References Cited

U.S. PATENT DOCUMENTS 5,465,037 A * 11/1995 Huissoon ............... B25J 9/1684
901/42
6,278,074 B1 * 8/2001 Morlock ................. E01B 29/42
901/42
(Continued)

FOREIGN PATENT DOCUMENTS

CN 106041258 B 2/2018
CN 105834557 B 10/2018
(Continued)

OTHER PUBLICATIONS

Kuka.RobtosSensorInterface, Kuka Robotics Corporation, https://www.kuka.com/en-us/products/robotics-systems/software/application-software/kuka_robotsensorinterface.
(Continued)

*Primary Examiner* — Abby Lin
*Assistant Examiner* — Danielle M Jackson
(74) *Attorney, Agent, or Firm* — John A. Miller; Shumaker, Loop & Kendrick, LLP

(57) ABSTRACT

A method for performing robot dynamic path modification using a remote tool center point (RTCP) coordinate frame, for applications such as material dispensing. A processing tool is fixedly mounted in a workcell and the robot holds and moves the workpiece during the processing. The RTCP coordinate frame is defined at the tip of the tool. A nominal processing path on the workpiece is defined, and a prescribed offset distance from the tip of the tool to the workpiece is defined. A sensor measures the actual offset distance from the tool tip to the workpiece. A controller applies the offset in the RTCP coordinate frame and calculates robot motions causing the robot to move the workpiece nominal path past the tool tip at the offset distance. The controller converts the offset from the RTCP frame to a
(Continued)

workcell frame, and performs inverse kinematics calculations to generate robot joint motion commands.

20 Claims, 8 Drawing Sheets

(58) Field of Classification Search
CPC ...... G05B 19/4155; G05B 2219/40269; G05D 1/242; G05D 1/243; G05D 1/43; G05D 1/648
See application file for complete search history.

(56) References Cited

U.S. PATENT DOCUMENTS

| | | | | |
|---|---|---|---|---|
| 8,774,965 | B2 | 7/2014 | Weiss et al. | |
| 9,891,618 | B2 | 2/2018 | Liang et al. | |
| 2008/0027580 | A1* | 1/2008 | Zhang | B25J 9/1633 700/245 |
| 2008/0234863 | A1* | 9/2008 | Pagel | B25J 9/1692 700/254 |
| 2015/0336267 | A1* | 11/2015 | Sun | G05B 19/0405 901/41 |
| 2016/0008979 | A1 | 1/2016 | Kirsten | |
| 2023/0117928 | A1* | 4/2023 | Bellicoso | B25J 9/1633 700/255 |
| 2024/0109196 | A1* | 4/2024 | Švub | B25J 9/1682 |
| 2025/0229352 | A1* | 7/2025 | Uchikata | B23K 9/0953 |

FOREIGN PATENT DOCUMENTS

| | | | | |
|---|---|---|---|---|
| CN | 105798432 B | | 4/2019 | |
| CN | 110238556 B | | 2/2021 | |
| CN | 112916351 A | | 6/2021 | |
| CN | 113109347 A | | 7/2021 | |
| CN | 116237639 A | * | 6/2023 | B23K 26/21 |
| KR | 100527465 B1 | | 11/2005 | |
| KR | 100794714 B1 | | 1/2008 | |

OTHER PUBLICATIONS

Kuka.SeamTech, Kuka Robotics Corporation, https://www.kuka.com/en-us/products/robotics-systems/software/application-software/kuka_seamtech.

Terzi, Function generator for adjusting the distance, Robot-Forum.com, Sep. 15, 2016, https://www.robot-forum.com/robotforum/thread/20940-function-generator-for-adjusting-the-distance/.

* cited by examiner

ROBOT REAL TIME PATH TRACKING UNDER REMOTE TOOL CENTER POINT FRAME

CROSS-REFERENCE TO RELATED APPLICATIONS

This application claims the benefit of the priority date of U.S. Provisional Patent Application Ser. No. 63/519,893, titled ROBOT REAL TIME PATH TRACKING UNDER REMOTE TOOL CENTER POINT FRAME, filed Aug. 16, 2023.

BACKGROUND

Field

The present disclosure relates generally to the field of industrial robot real-time motion control and, more particularly, to a method for controlling a robot where a tool is fixed and the robot holds and moves a workpiece, where a nominal path is defined on the workpiece along with a user-prescribed tool offset, and the workpiece is moved by the robot such that the tool tip traces a path which is offset from the nominal path by the user-prescribed amount.

Discussion of the Related Art

The use of industrial robots to perform a wide range of manufacturing, assembly and material movement operations is well known. Many of these operations and tasks are performed by articulated robots, such as five- or six-axis robots with a servo motor at each rotational joint. Control of such robots is provided in real time, where an end-of-arm tool center point motion program is divided into small increments of motion, and a robot controller performs the real-time feedback control calculations to compute joint motor input commands which move the robot end-of-arm tool according to the prescribed motion program.

Some common robotic applications involve moving a tool along a continuous path on a workpiece. These applications include specific examples such as dispensing a bead of caulk or adhesive along a path on the workpiece, laser welding and cutting, and even grinding an edge or surface of the workpiece.

Traditional techniques for robot motion programming for these continuous path tracing applications involve holding the workpiece in a fixture and the robot moving the tool so that the tool tip traces the continuous path on the workpiece. These methods can be satisfactory for some simple types of traced paths, but they require a second robot (or a human, etc.) to remove each workpiece after processing and place a new workpiece in the fixture.

A more significant limitation of existing path tracing methods is that both the nominal path on the workpiece and any offset are calculated in a “world” (workcell) coordinate frame. Not only does this limit the ability to control the distance and orientation of the tool tip offset, but it also makes it impossible or impractical to implement real-time tracking of the offset using a sensor and control the robot to fine tune the offset in real time.

In light of the circumstances described above, there is a need for an improved method for robot real-time path tracking which simplifies definition of the desired offset and enables real-time tracking of the actual offset, while also enabling the robot to handle successive workpieces without assistance.

SUMMARY

The present disclosure describes a method and system for performing robot dynamic path modification using a remote tool center point (RTCP) coordinate frame, for process applications such as material dispensing or laser cutting. A processing tool is mounted in a fixed position in the workcell and the robot holds and moves the workpiece during the processing. The RTCP coordinate frame is defined at the tip of the tool. A nominal processing path on the workpiece is defined, and a prescribed offset distance is defined, such as a distance from the tip of the processing tool to the workpiece which provides optimal quality of the process being performed. A sensor on or near the processing tool measures the actual offset distance from the tip of the tool to the workpiece. A robot controller applies the offset in the RTCP coordinate frame and calculates robot motions to cause the robot to move the workpiece such that the nominal path is moved past the tip of the processing tool while maintaining the prescribed offset distance. The controller converts the offset from remote tool center point coordinate frame to workcell (world) coordinate frame, and performs inverse kinematics calculations to generate the required robot joint motion commands.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to dynamic path modification using a remote tool center point coordinate frame is merely exemplary in nature, and is in no way intended to limit the disclosed devices and techniques or their applications or uses.

Industrial robots are used for a variety of manufacturing, assembly and material movement operations. In one common type of application, a processing operation is performed using the robot-such as dispensing a bead of caulk, cutting material using a torch, or performing a laser welding operation. These processing operations all involve a processing tool tracing a continuous path along a workpiece.

Figure 1:
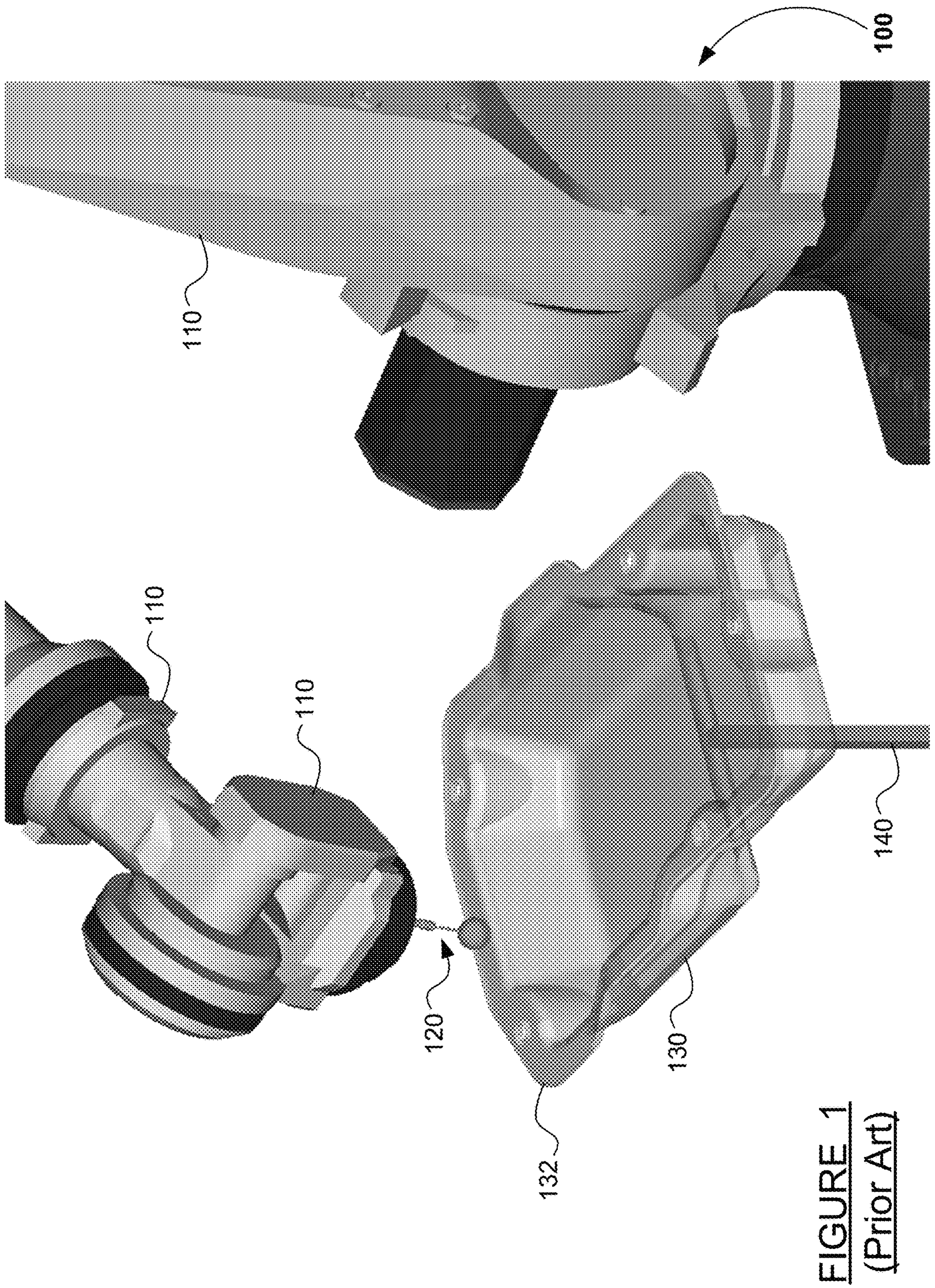
FIGURE 1 (Prior Art)
FIG. 1 is an illustration of an industrial robot performing a processing operation on a workpiece by moving a processing tool along a prescribed path with the workpiece held in a fixed position, as known in the art.

FIG. 1 is an illustration of an industrial robot performing a processing operation on a workpiece by moving a processing tool along a prescribed path with the workpiece held in a fixed position, as known in the art. A robot 100 (only partially shown) is a multi-axis articulated robot having a fixed base, a number of arm links 110, and a tool—as understood by those skilled in the art. A processing tool 120 is coupled to an outer arm link at a wrist joint, or in a similar configuration, where the robot 100 can control the joint angular positions such that the tip of the tool 120 is moved to any desired position and orientation.

A workpiece 130 is held in a fixed location in the robot workcell by a fixture 140, illustrated as a simple pole or rod. In the prior art technique of FIG. 1, the robot 100 is controlled by a controller (not shown) to move the tip of the processing tool 120 along a prescribed path 132 on the fixed workpiece 130. Consider for example that the processing tool 120 is a material dispenser and the processing operation is to apply a bead of adhesive along the path 132 on the workpiece 130. The workpiece 130 then needs to be detached from the fixture 140 (by another robot or machine, or by a human) and assembled with a mating part, and a new workpiece needs to be attached to the fixture 140 (possibly by yet another robot or another person).

The prior art technique illustrated in FIG. 1 has been used effectively for countless applications, although additional machinery or labor is required to handle the workpieces before and after processing. Another disadvantage of the prior art processing technique arises if an offset needs to be maintained between the tip of the tool 120 and the path 132 on the workpiece 130. The offset in such applications normally needs to be measured perpendicular to the path 132, which can include a complex three-dimensional routing as it follows the surface of the workpiece 130. This method of the robot carrying the tool works well if the tool is relatively light, but there are several reasons that it may improve the application for the tool to be fixed and the robot to carry the workpiece. For example, the workpiece is relatively light, but the tool has complicated dressout (requires heavy or stationary plumbing, such as some plasma cutting, waterjet cutting, or welding applications), or the tool is sensitive to the mechanical compliance of the arm (such as grinding) and is better held in a strong fixture, or the process is difficult to control, so it is best for the dressout to be short (such as dispensing with hot sealant, which can be difficult to keep hot and accurately control the dispense rate through a long hose), or a sensor associated with the tool cannot be mounted on the robot so it is better for the application for the tool to be mounted in a fixed position.

The techniques of the present disclosure have been developed to overcome the shortcomings of prior art methods of continuous path processing operations as illustrated in FIG. 1.

Figure 2A:
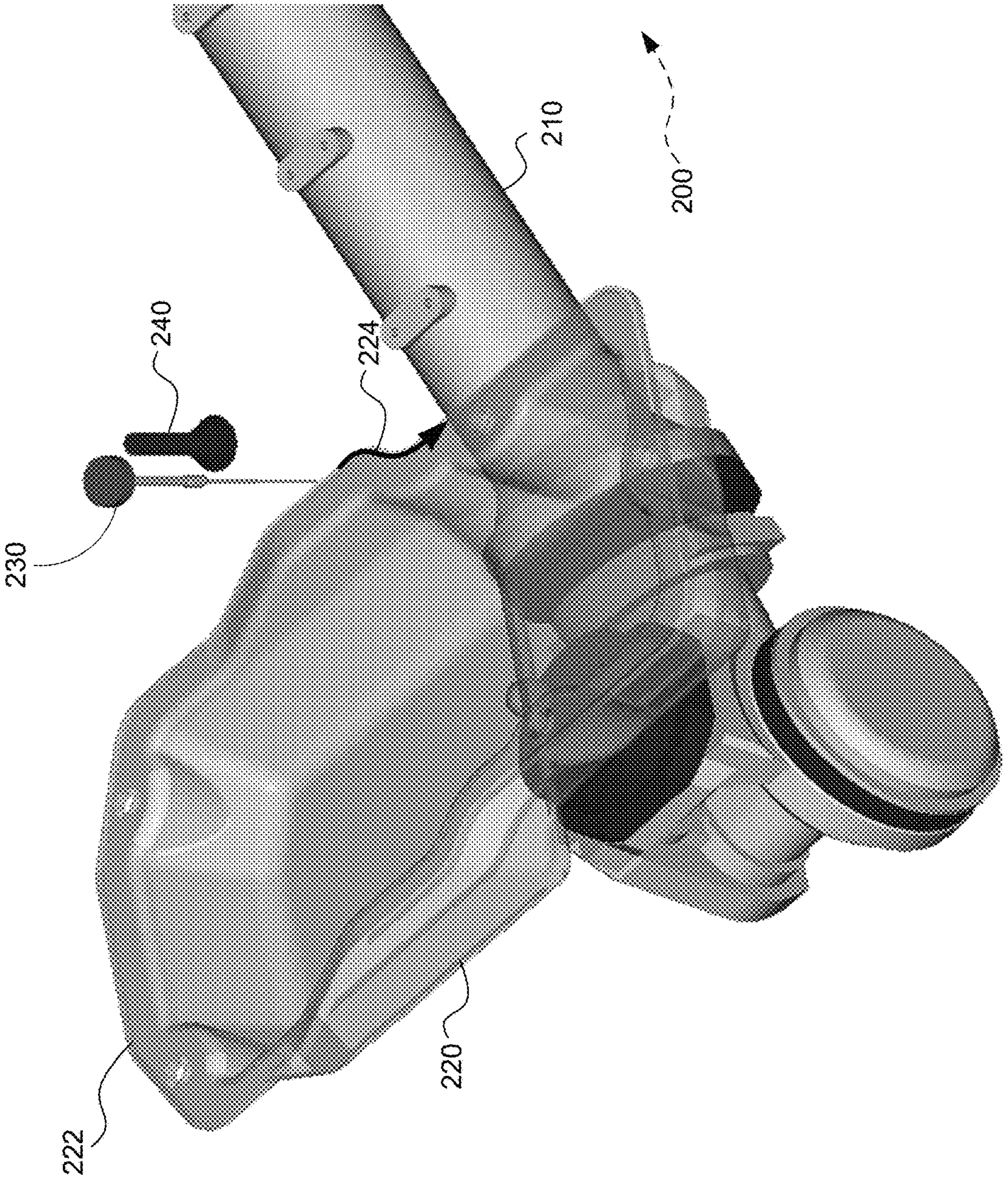
FIGS. 2A, 2B and 2C are illustrations of an industrial robot performing a processing operation by moving a workpiece relative to a fixed processing tool, with dynamic path modification using a remote tool center point coordinate frame, according to an embodiment of the present disclosure.
Figure 2B:
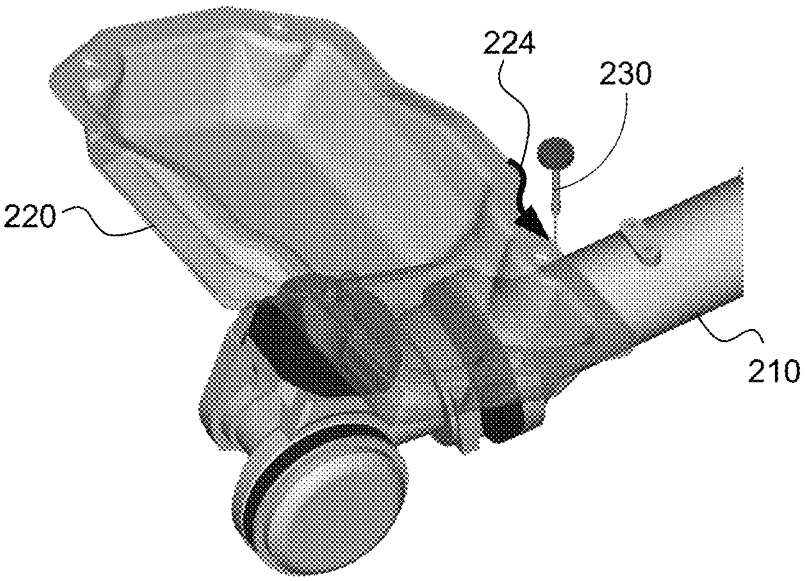
Figure 2C:
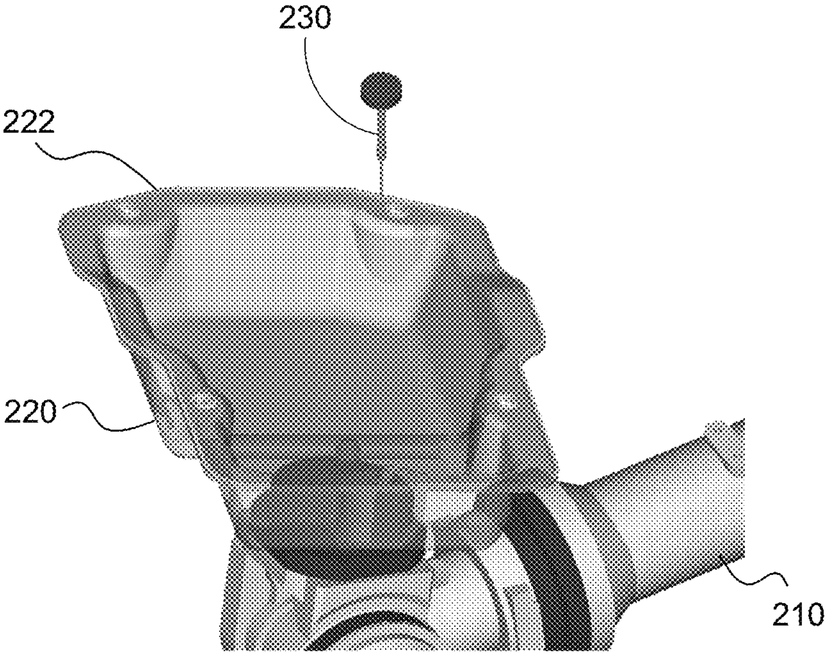

FIGS. 2A, 2B and 2C are illustrations of an industrial robot performing a processing operation by moving a workpiece relative to a fixed processing tool, with dynamic path modification using a remote tool center point coordinate frame, according to an embodiment of the present disclosure. A robot 200 (mainly off the page to the right) is a multi-axis articulated robot having a number of arm links 210, as discussed above. In this case, the robot 200 holds a workpiece 220 and moves the workpiece 220 relative to a fixed processing tool 230. A sensor 240 is fixedly mounted to the tool 230 or in a location proximal the tool 230.

A nominal path 222 is defined on the workpiece 220. The nominal path 222 may be defined in a 3D computer aided design (CAD) system, where a solid model of the workpiece 220 is available, in a manner understood by those skilled in the art. The nominal path 222, which is three-dimensional in nature due to some elevation changes in the mating surface of the workpiece 220, is typically defined directly on the workpiece surface (the mating surface, facing upward in this view). In the example illustrated throughout the present disclosure, the nominal path 222 is along an outer edge on the “flange” or mating surface of the workpiece 220.

In FIG. 2A, the tip of the tool 230 (defined as a remote tool center point) is located at a starting point along the nominal path 222. The direction that the tool center point will trace the path 222 is indicated by arrow 224. FIGS. 2B and 2C show the tool 230 in the same position (because the tool 230 is fixed), while the robot 200 moves the workpiece 220 so that the path 222 is traced across the tool center point. FIG. 2B shows the robot arm 210 having moved the workpiece 220 a short distance along the path 222 relative to the tool 230, as indicated by the arrow 224. FIG. 2C shows the robot arm 210 having moved the workpiece 220 so that most of the path 222 has been traced across the tip of the tool 230. This is a fundamental operating principle of the presently disclosed techniques; the processing tool is fixed, and the robot moves the workpiece while the processing operation is performed upon it.

In the simplest processing application example, the robot 200 could manipulate the workpiece 220 so that the tip of the tool 230 traces the nominal path 222 directly on the surface of the workpiece 220. However, in many real world examples, it is desirable for the tip of the tool 230 (the remote tool center point) to be offset from the nominal path 222 by some user-prescribed distance. This offset distance and how it is handled in the techniques of the present disclosure are discussed further below.

Figure 3:
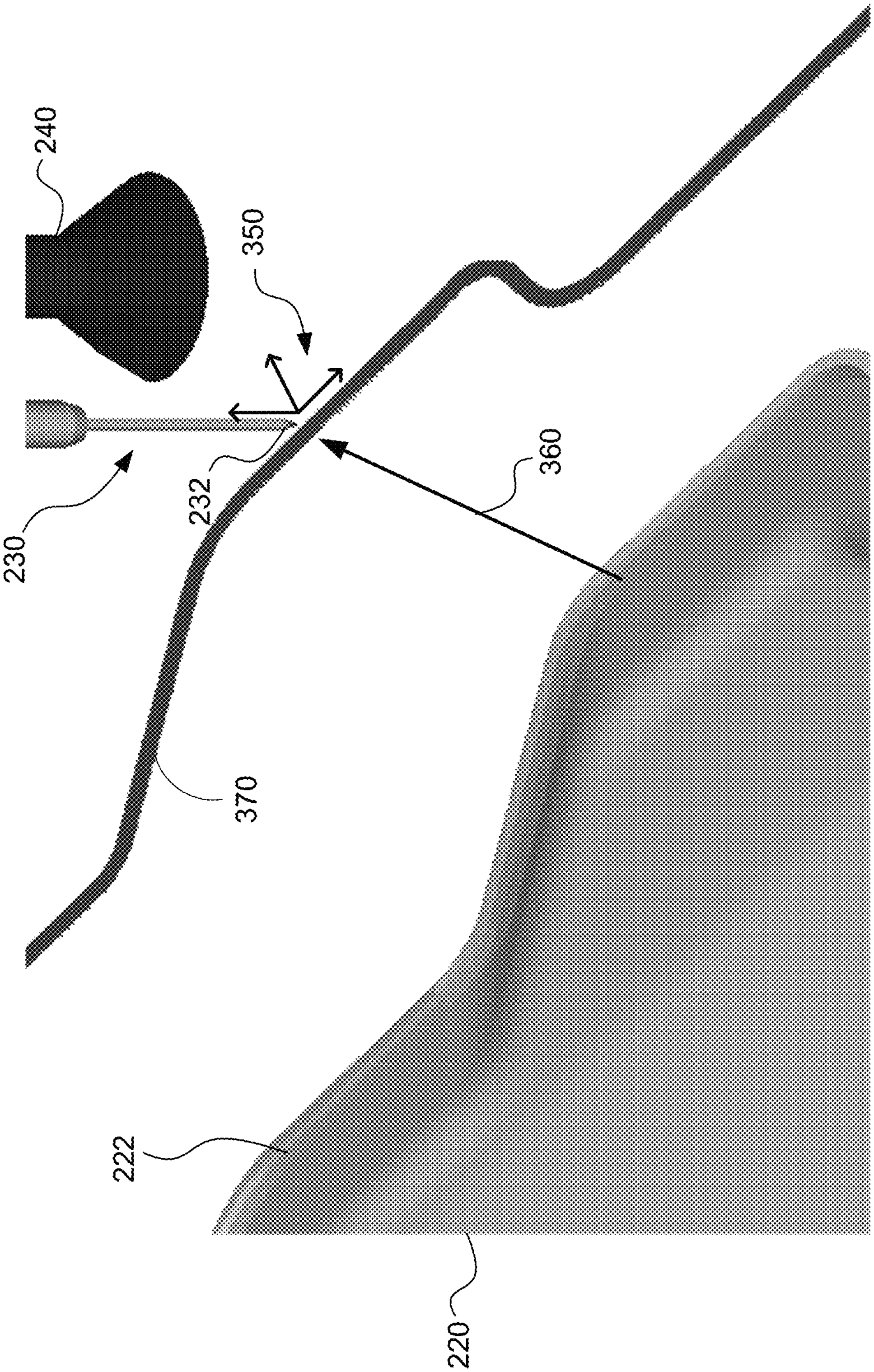
FIG. 3 is an illustration of a workpiece being moved relative to a fixed processing tool, with dynamic path modification using a remote tool center point coordinate frame, according to an embodiment of the present disclosure.

FIG. 3 is an illustration of a workpiece being moved relative to a fixed processing tool, with dynamic path modification using a remote tool center point coordinate frame, according to an embodiment of the present disclosure. FIG. 3 depicts the same workpiece 220 as in FIG. 2, along with other hardware components and principles involved in the techniques of the present disclosure.

The robot 200 and robot arm 210 are not shown in FIG. 3, but they operate as described before; the workpiece 220 is coupled to an end-of-arm gripper or tool on the robot arm 210. The robot 200 is controlled to move the workpiece 220 so that an offset path on the workpiece 220 is traced across a tip 232 of the tool 230. Only a portion of the workpiece 220 is shown in FIG. 3, along with a portion of the nominal path 222 which was described earlier. The sensor 240, fixed to or proximal to the tool 230, is also shown. The sensor 240 may be any type of sensor suitable for determining a distance between the tip 232 of the tool 230 and the surface of the workpiece 220 along the nominal path 222. Non-limiting examples of the sensor 240 include a laser distance sensor, an ultrasonic sensor, and a 3D camera. The sensor 240 may also be a combination of the listed sensor types, and may be configured for sensing parameters of the processing operation itself—such as a surface finish quality, a size of a dispensed material bead, or some other parameter. These sensor measurements—including both the offset distance and parameters of the processing operation, are used to compute dynamic adjustments to the commanded offset distance in real time during the processing operation.

A remote tool center point coordinate frame (RTCP frame) 350 is defined at the tip 232 of the tool 230, having a fixed position and orientation known to the robot controller. The RTCP frame 350 is shown (with a slight offset from the tip 232 for visual clarity) in FIG. 3 having one axis pointing upward and the other two axes in a horizontal plane; however, any RTCP frame orientation may be used as suitable for a particular application. In one preferred embodiment, the local Z axis of the RTCP frame 350 is oriented parallel to the axis of the tool 230, with the positive Z direction pointed "downward" toward the workpiece 220.

An offset path 370 is offset from the nominal path 222 by an offset vector 360. Measurements of an actual offset distance are made by the sensor 240 and calculations in the RTCP frame 350 are performed by the controller, which then controls the robot 200 to move the workpiece 220 so that the offset path 370 is traced across the tip 232 of the processing tool 230. The purpose of the offset is to position the tip 232 of the processing tool 230 at an optimal distance from the surface of the workpiece 220 for the particular processing operation being performed. For example, an offset of 5 mm may be used to achieve the best quality bead of caulk from an applicator tool, or an offset of 7 mm may be used from the tip of a laser welding tool. The offset amount is defined by the user and may be in any vector direction or orientation in the RTCP frame 350. The amount of the offset may vary along the length of the nominal path 222. This is all discussed further below.

Figure 4:
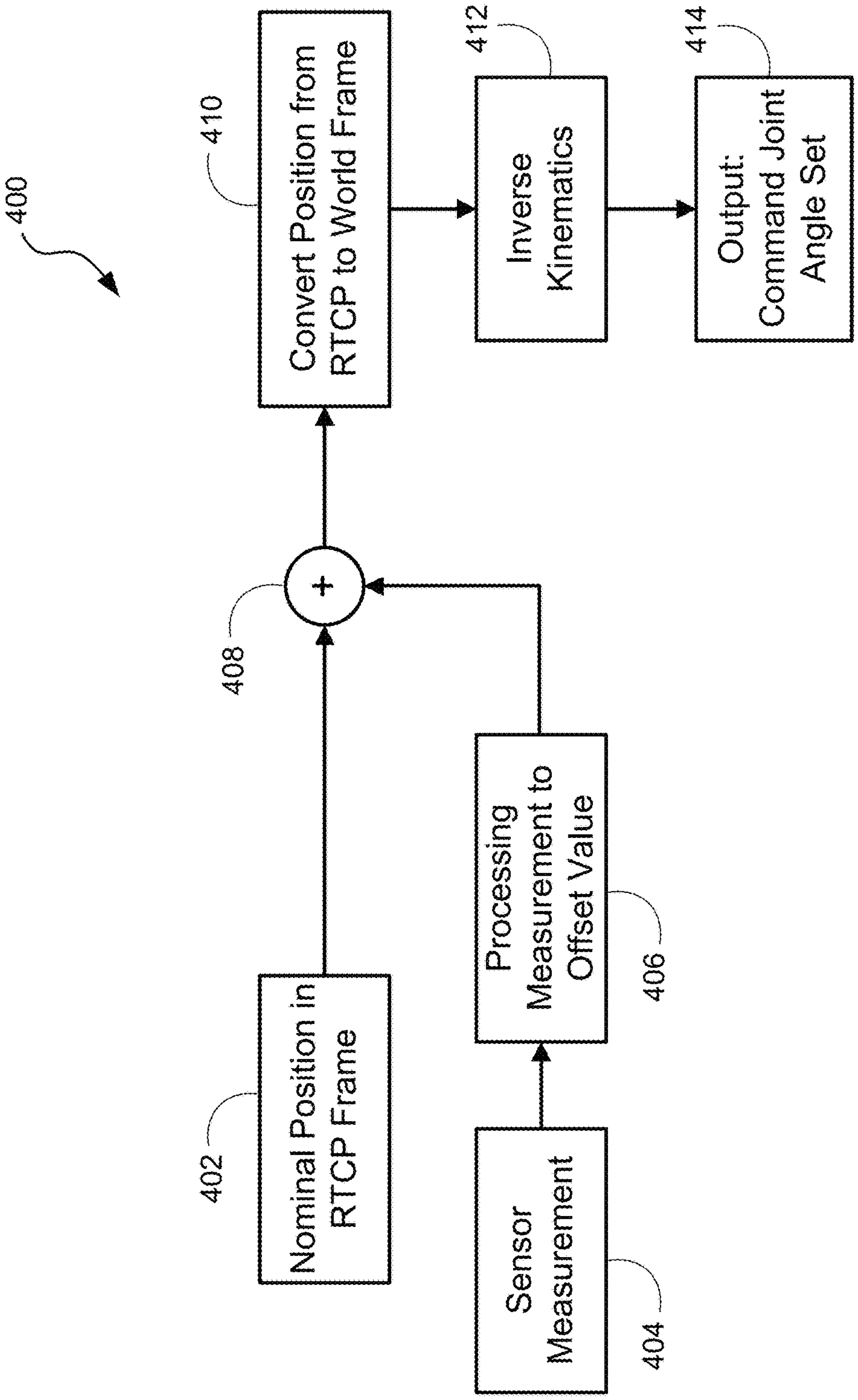
FIG. 4 is a flowchart diagram of a method for dynamic path modification using a remote tool center point coordinate frame, according to an embodiment of the present disclosure.

FIG. 4 is a flowchart diagram 400 of a method for dynamic path modification using a remote tool center point coordinate frame, according to an embodiment of the present disclosure. Before the method of FIG. 4 is performed, the workpiece is mounted on the robot arm, the processing tool and the sensor are fixed in the workcell, the remote tool center point coordinate frame (RTCP frame) is defined at the tool tip, the nominal path of the processing operation on the workpiece is defined and the desired offset distance between the tool tip and the nominal path is defined. The steps of the flowchart diagram 400 are then performed in the robot controller, continuously and in real time.

At box 402, the current position along the nominal path in the RTCP frame is determined. The current position along the nominal path is known by the robot controller. The desired offset distance corresponding to the current position along the nominal path is also determined. The desired offset distance may be constant for the entire nominal path, or it may vary with positional along the nominal path, as discussed earlier.

At box 404, a measurement is taken by the sensor and provided to the robot controller. At box 406, the sensor measurement is processed to determine the actual offset in the RTCP frame. Because of small variations in workpiece shape, process dynamics (for example, sealant viscosity is not consistent), workpiece-to-robot mounting configuration and other factors, the actual offset may be slightly different than what would be obtained by applying the desired (theoretical) offset to the nominal path. The measurement at the box 404 and determination of the actual offset at the box 406 provide a real-time measured feedback signal for accurate control of the robot. That is, if the actual measured offset is less than the desired offset at the current position along the nominal path, then the difference (desired minus measured) will be added to the desired offset distance to be used in the next step.

At summing junction 408, the actual offset from the box 406 is applied to the nominal path and the desired offset, to calculate any deviation needing to be corrected in the next robot control cycle. For example, if the actual offset distance is 0.1 mm smaller than the desired offset distance relative to the nominal path, then at the next control cycle the controller will command a robot target position which moves to the next incremental positional along the nominal path while increasing the desired offset by 0.1 mm.

At box 410, the robot target position described above is converted from the RTCP frame to the world (workcell) coordinate frame. The world or workcell coordinate frame is the coordinate frame in which robot motions are programmed. At box 412, inverse kinematics calculations are performed to determine robot joint motions which will cause the target position "on" the workpiece (actually offset from the workpiece, at a location which is in a known position and orientation relative to the robot gripper) to be moved to the location of the tool tip fixed in the workcell. At box 414, the joint angle set computed at the box 412 is output; that is, the robot is moved to the calculated joint angles. From the box 414, the process continuously loops back to the boxes 402 and 404 for the next robot control cycle.

Figure 5:
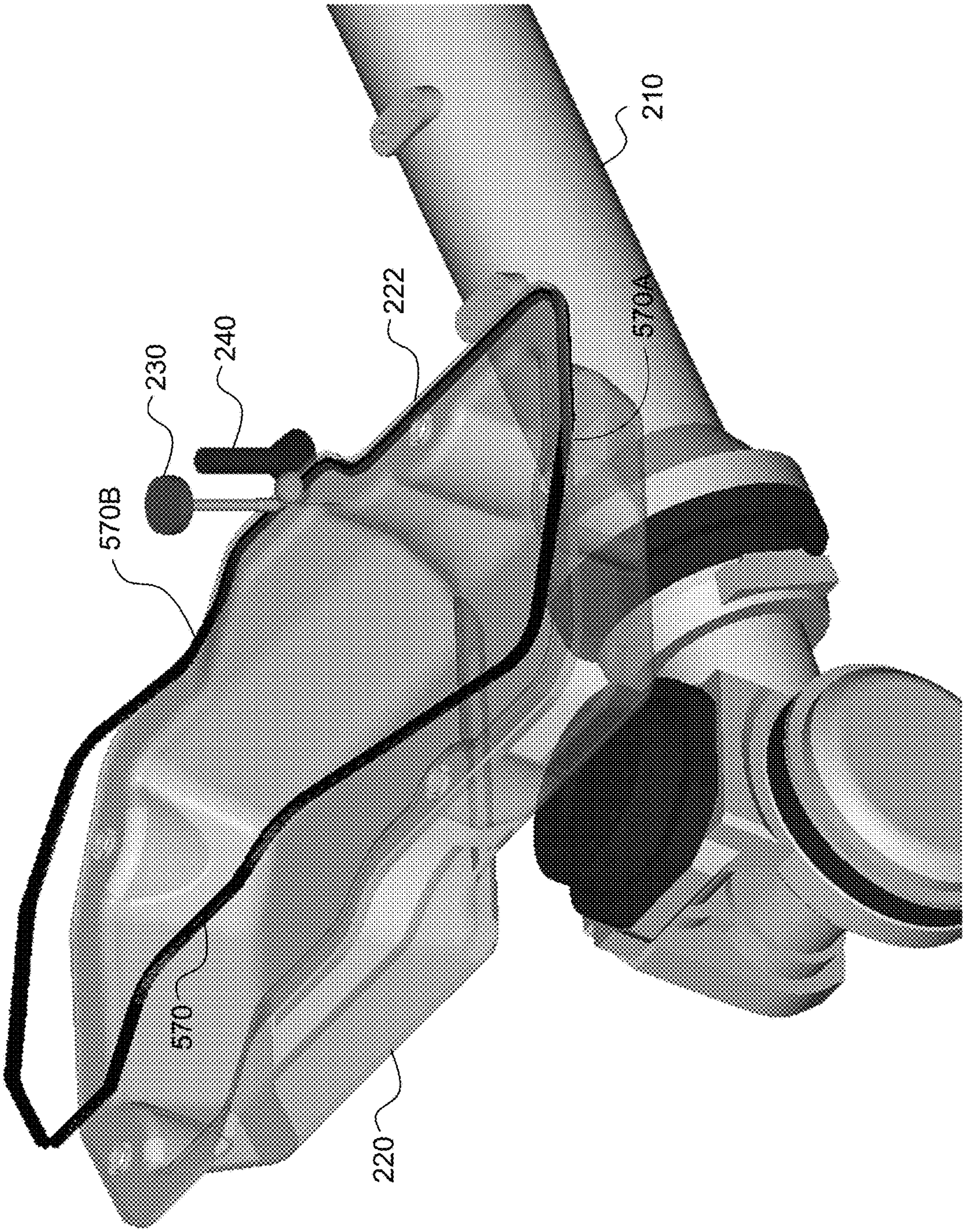
FIG. 5 is an illustration of a workpiece being moved relative to a fixed processing tool, with dynamic path modification using a remote tool center point coordinate frame, including a variable offset distance, according to an embodiment of the present disclosure.

FIG. 5 is an illustration of a workpiece being moved relative to a fixed processing tool, with dynamic path modification using a remote tool center point coordinate frame, including a variable offset distance, according to an embodiment of the present disclosure. FIG. 5 depicts the same workpiece 220 and nominal path 222 as in FIG. 2, along with the robot arm 210 and the processing tool 230 as discussed earlier. The sensor 240 is also shown as before.

In FIG. 5, the offset distance varies according to the position along the nominal path 222. One reason for varying the offset distance would be for an application where the velocity of the workpiece relative to the tool is also varied along the nominal path-such as when a larger or smaller bead of caulk is needed in one location or another of the workpiece.

An offset path 570 is different than the offset path 370 described earlier. At the start/end position on the nominal path 222, the desired offset distance is defined as zero. At a point 570A, the desired offset distance begins to ramp up, then levels off at a constant offset value as the nominal path moves along the left rim of the workpiece 220. The desired offset distance then begins to ramp back down, and reaches zero at a point 570B. The nominal path 222 and/or the shape of the desired offset may be defined using a spline function. The example of FIG. 5 illustrates the flexibility of the disclosed techniques for tailoring the offset to any particular application, which can be achieved by making the desired offset distance a parameter which varies based on the position along the nominal path 222.

Figure 6:
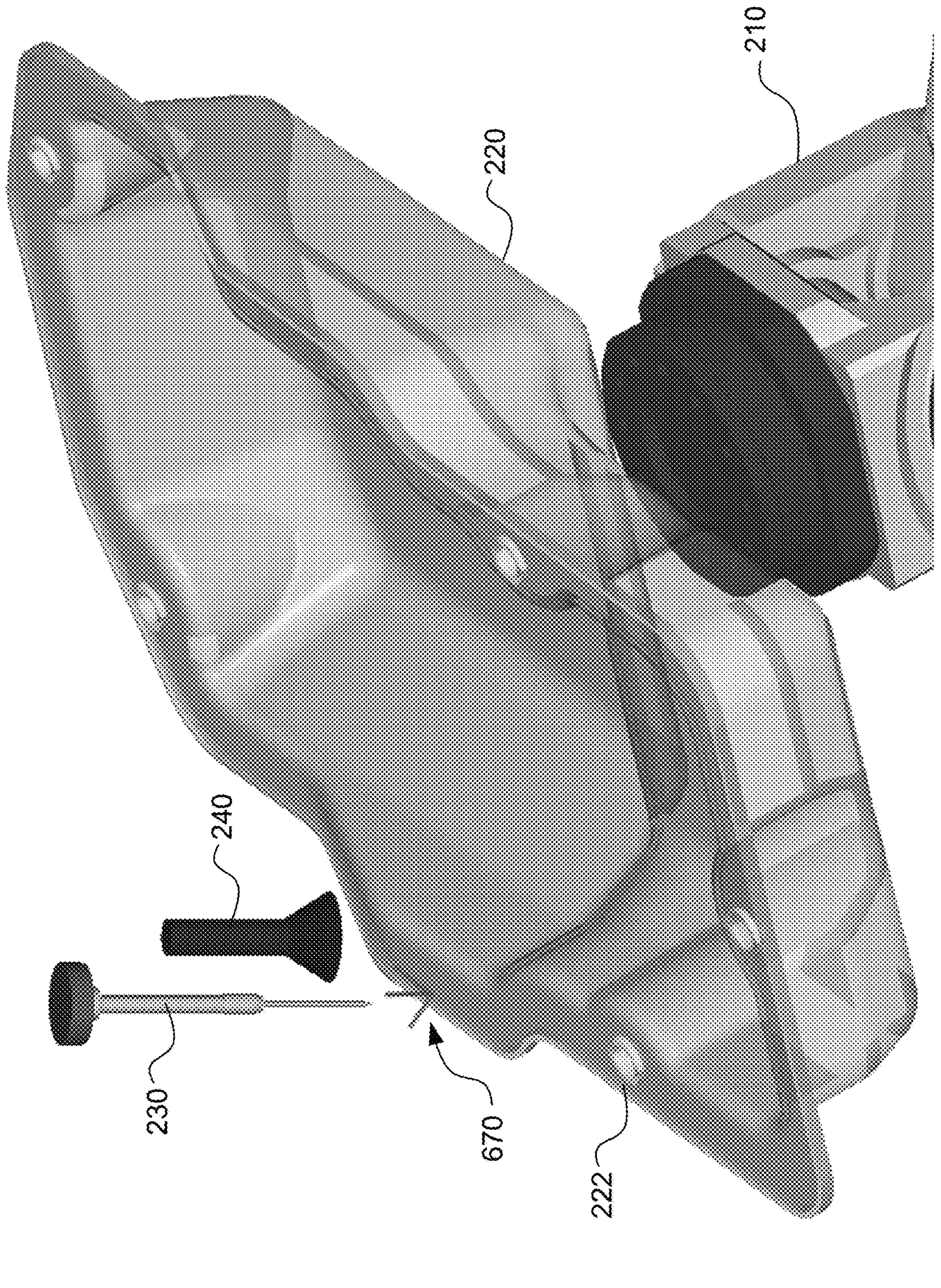
FIG. 6 is an illustration of a workpiece being moved relative to a fixed processing tool, with dynamic path modification using a remote tool center point coordinate frame, including stationary tracking, according to an embodiment of the present disclosure.

FIG. 6 is an illustration of a workpiece being moved relative to a fixed processing tool, with dynamic path modification using a remote tool center point coordinate frame, including stationary tracking, according to an embodiment of the present disclosure. FIG. 6 depicts the same workpiece 220 and nominal path 222 as in FIG. 2, along with the robot arm 210, the processing tool 230 and the sensor 240 as discussed earlier.

In FIG. 6, a set of offsets 670 are applied in a stationary tracking mode, where the position along the nominal path 222 is held fixed, and offsets in the principle directions of the RTCP frame are applied. Stationary tracking with multiple offsets may be useful for laser welding a bracket to the main workpiece, for example. The example of FIG. 6 again illustrates the flexibility of the disclosed techniques for tailoring the offset vector to any particular application requirements.

Figure 7:
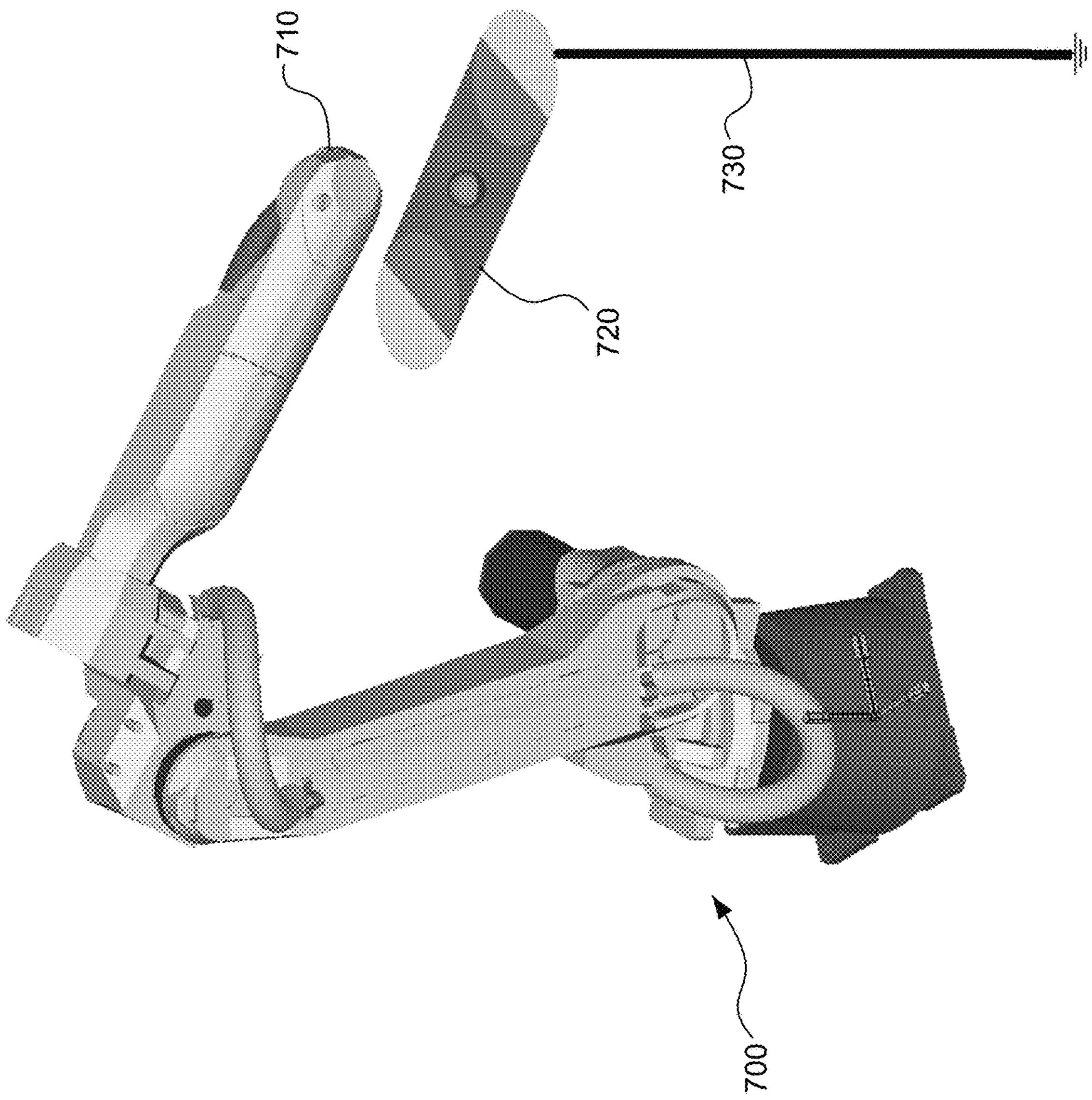
FIG. 7 is an illustration of a workpiece being moved relative to a fixed processing tool, with dynamic path modification using a remote tool center point coordinate frame, according to another embodiment of the present disclosure.

FIG. 7 is an illustration of a workpiece being moved relative to a fixed processing tool, with dynamic path modification using a remote tool center point coordinate frame, according to another embodiment of the present disclosure. FIG. 7 depicts a robot 700 having a robot arm 710, moving a workpiece 720 in a different application than those discussed earlier. A processing tool 730 is shown fixed to ground with a tool tip (tool center point) at the top of the tool 730. The sensor which would be mounted on or proximal to the tool 730 is omitted from FIG. 7 for drawing clarity.

In FIG. 7, the processing tool 730 may be a grinding tool, and the robot 700 moves the workpiece 720 around in various spatial orientations to cause the grinding tool 730 to grind edges and surfaces of the workpiece 720. FIG. 7 shows an example where the nominal path on the workpiece 720 may be moved to different spatial positions relative to the tip of the tool 730, and the offset may therefore be defined with varying vector components, or the offset may be calculated in 3D vector space rather than simply along a Z axis of the RTCP frame, for example.

Throughout the preceding discussion, various computers and controllers are described and implied. It is to be understood that the software applications and modules of these computers and controllers are executed on one or more electronic computing devices having a processor and a memory module. In particular, this includes a processor in the robot controller discussed above. Specifically, the processors in these devices are configured to perform the robot dynamic path modification using a remote tool center point coordinate frame described above.

While a number of exemplary aspects and embodiments of the methods and systems for robot dynamic path modification using a remote tool center point coordinate frame have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for dynamic path control of an industrial robot, said method comprising:

mounting a workpiece on a robot arm;

providing a processing tool having a tool tip at a fixed position and orientation, and a sensor at a fixed position and orientation proximal the tool tip;

defining, in a computer having a processor and memory, a remote tool center point coordinate frame (RTCP frame) having a fixed position and orientation, where the RTCP frame has an origin at the tool tip and a z-axis aligned with an axial length of the processing tool;

pre-defining, in the computer, a nominal path of a processing operation on the workpiece;

pre-defining, in the computer, an offset distance profile, in coordinates of the RTCP frame and including at least a z-axis offset component, for all positions on the nominal path;

determining, by the computer, a desired offset distance between the tool tip and the nominal path, using a current workpiece position, the offset distance profile and measurement data from the sensor; and controlling the robot arm, using the computer, to move the workpiece so that the nominal path moves past the tool tip at the desired offset distance.

2. The method according to claim 1 wherein controlling the robot arm includes:

determining a target location on an offset path;

converting the target location from the RTCP frame to a world coordinate frame;

performing an inverse kinematic calculation on the target location in the world coordinate frame to compute robot joint commands which move the workpiece so that the target location on the offset path is positioned at the origin of the RTCP frame; and using the robot joint commands, by the computer, to control the robot arm.

3. The method according to claim 2 further comprising performing stationary tracking, wherein the robot arm moves the workpiece to cause a set of offset vectors to be traced by the tool tip relative to the target location on the offset path.

4. The method according to claim 1 wherein determining a target location includes:

determining a current location of the processing operation along the nominal path based on the current workpiece position;

determining the desired offset distance based on the current location and the offset distance profile;

measuring an actual offset distance between the tool tip and the workpiece using the sensor;

determining an adjusted offset distance by subtracting the actual offset distance from the desired offset distance, then adding the desired offset distance;

computing the target location on the offset path by offsetting the current location of the processing operation along the nominal path by the adjusted offset distance.

5. The method according to claim 1 wherein the nominal path is defined as a spline function.

6. The method according to claim 1 wherein the desired offset distance varies based on location along the nominal path.

7. The method according to claim 1 wherein the sensor uses one or more of laser sensing, ultrasonic sensing or camera imaging.

8. The method according to claim 1 wherein the processing tool is a material dispenser, a cutting or welding tool having a laser or a torch, or a grinding tool.

9. The method according to claim 1 wherein the industrial robot is a multi-axis articulated robot and the computer is a robot controller which sends joint motion commands to the industrial robot and receives joint state feedback used in closed loop robot control.

10. A method for dynamic path control of an industrial robot, said method comprising:

mounting a workpiece on a robot arm;

providing a processing tool having a tool tip at a fixed position and orientation, and a sensor at a fixed position and orientation proximal the tool tip;

defining, in a computer having a processor and memory, a remote tool center point coordinate frame (RTCP frame) having a fixed position and orientation, where the RTCP frame has an origin at the tool tip and a z-axis aligned with an axial length of the processing tool;

pre-defining, in the computer, a nominal path of a processing operation on the workpiece;

pre-defining, in the computer, an offset distance profile, in coordinates of the RTCP frame and including at least a z-axis offset component, for all positions on the nominal path;

determining, by the computer, a desired offset distance between the tool tip and the nominal path, using a current workpiece position, the offset distance profile and measurement data from the sensor; and controlling the robot arm, using the computer, to move the workpiece so that the nominal path moves past the tool tip at the desired offset distance, including determining a target location on an offset path based on the desired offset distance and an actual offset distance measured by the sensor, converting the target location from the RTCP frame to a world coordinate frame, performing an inverse kinematic calculation on the target location in the world coordinate frame to compute robot joint commands which move the workpiece so that the target location on the offset path is positioned at the origin of the RTCP frame, and using the robot joint commands, by the computer, to control the robot arm.

11. A dynamic path control system for an industrial robot, said system comprising:

a robot arm on which a workpiece is mounted;

a processing tool having a tool tip mounted at a fixed position and orientation;

a sensor mounted at a fixed position and orientation proximal the tool tip; and a controller having a processor and memory, said controller being configured with input data including a remote tool center point coordinate frame (RTCP frame) having a fixed position and orientation with an origin at the tool tip and a z-axis aligned with an axial length of the processing tool, a pre-defined nominal path of a processing operation on the workpiece, and a pre-defined offset distance profile, in coordinates of the RTCP frame and including at least a z-axis offset component, for all positions on the nominal path, said controller being further configured to compute a desired offset distance between the tool tip and the nominal path using a current workpiece position, the offset distance profile and measurement data from the sensor, and control the robot arm to move the workpiece so that the nominal path moves past the tool tip at the desired offset distance.

12. The system according to claim 11 wherein controlling the robot arm includes:

determining a target location on an offset path;

converting the target location from the RTCP frame to a world coordinate frame;

performing an inverse kinematic calculation on the target location in the world coordinate frame to compute robot joint commands which move the workpiece so that the target location on the offset path is positioned at the origin of the RTCP frame; and using the robot joint commands, by the controller, to control the robot arm.

13. The system according to claim 12 wherein determining a target location includes:

determining a current location of the processing operation along the nominal path based on the current workpiece position;

determining the desired offset distance based on the current location and the offset distance profile;

measuring an actual offset distance between the tool tip and the workpiece using the sensor;

determining an adjusted offset distance by subtracting the actual offset distance from the desired offset distance, then adding the desired offset distance;

computing the target location on the offset path by offsetting the current location of the processing operation along the nominal path by the adjusted offset distance.

14. The system according to claim 12 further comprising performing stationary tracking, wherein the robot arm moves the workpiece to cause a set of offset vectors to be traced by the tool tip relative to the target location on the offset path.

15. The system according to claim 11 wherein the desired offset distance varies based on location along the nominal path.

16. The system according to claim 11 wherein the sensor uses one or more of laser sensing, ultrasonic sensing or camera imaging.

17. The system according to claim 11 wherein the processing tool is a material dispenser, a cutting or welding tool having a laser or a torch, or a grinding tool.

18. The system according to claim 11 wherein the industrial robot is a multi-axis articulated robot and the controller sends joint motion commands to the industrial robot and receives joint state feedback used in closed loop robot control.

19. The method according to claim 1 wherein determining a desired offset distance between the tool tip and the nominal path includes sensing actual parameters of the processing operation performed on the workpiece by the processing tool, by the sensor, and dynamically adjusting the desired offset distance based on differences between the actual parameters and desired parameters of the processing operation.

20. The system according to claim 11 wherein determining a desired offset distance between the tool tip and the nominal path includes sensing actual parameters of the processing operation performed on the workpiece by the processing tool, by the sensor, and dynamically adjusting the desired offset distance based on differences between the actual parameters and desired parameters of the processing operation.

* * * * *